Figure 1:
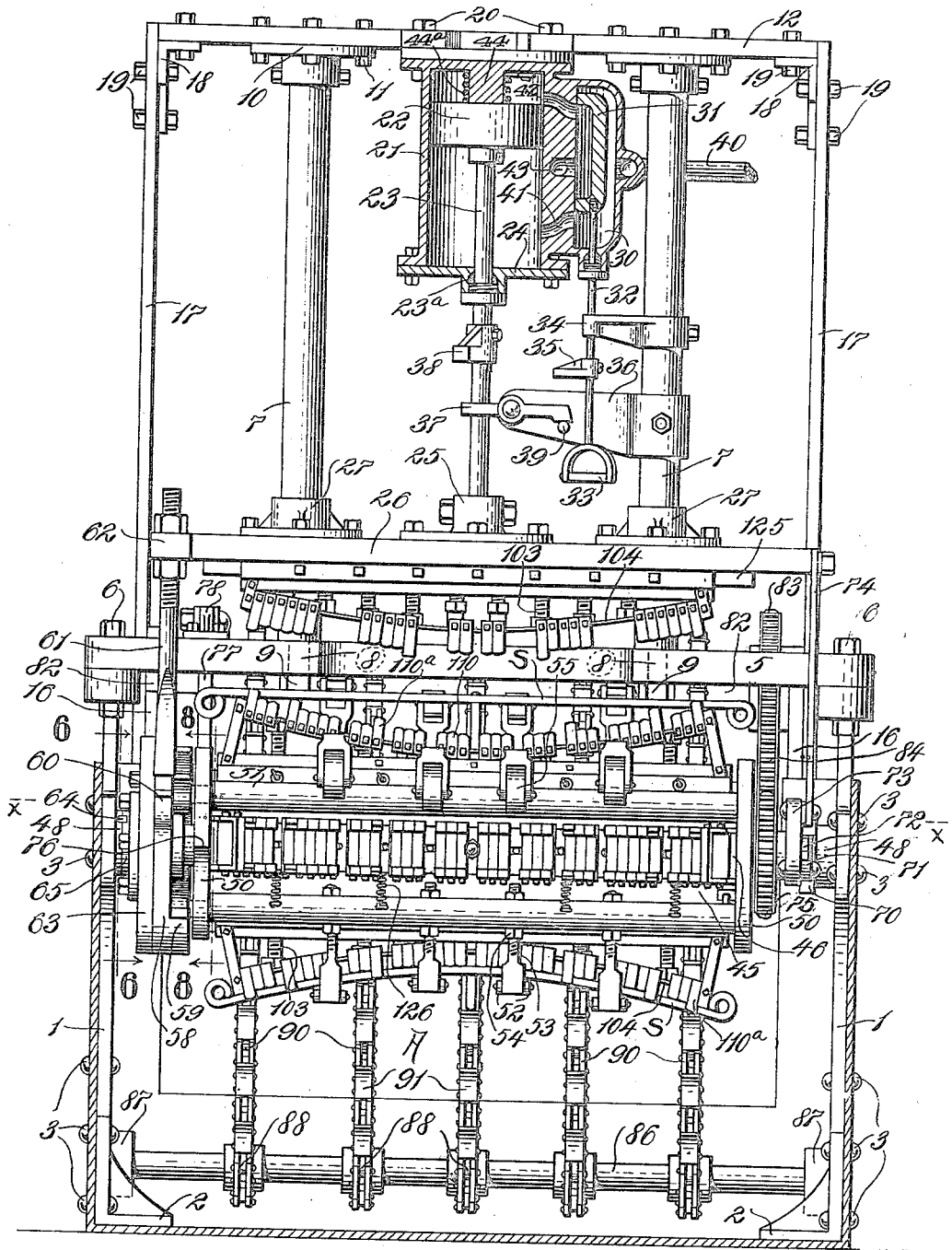

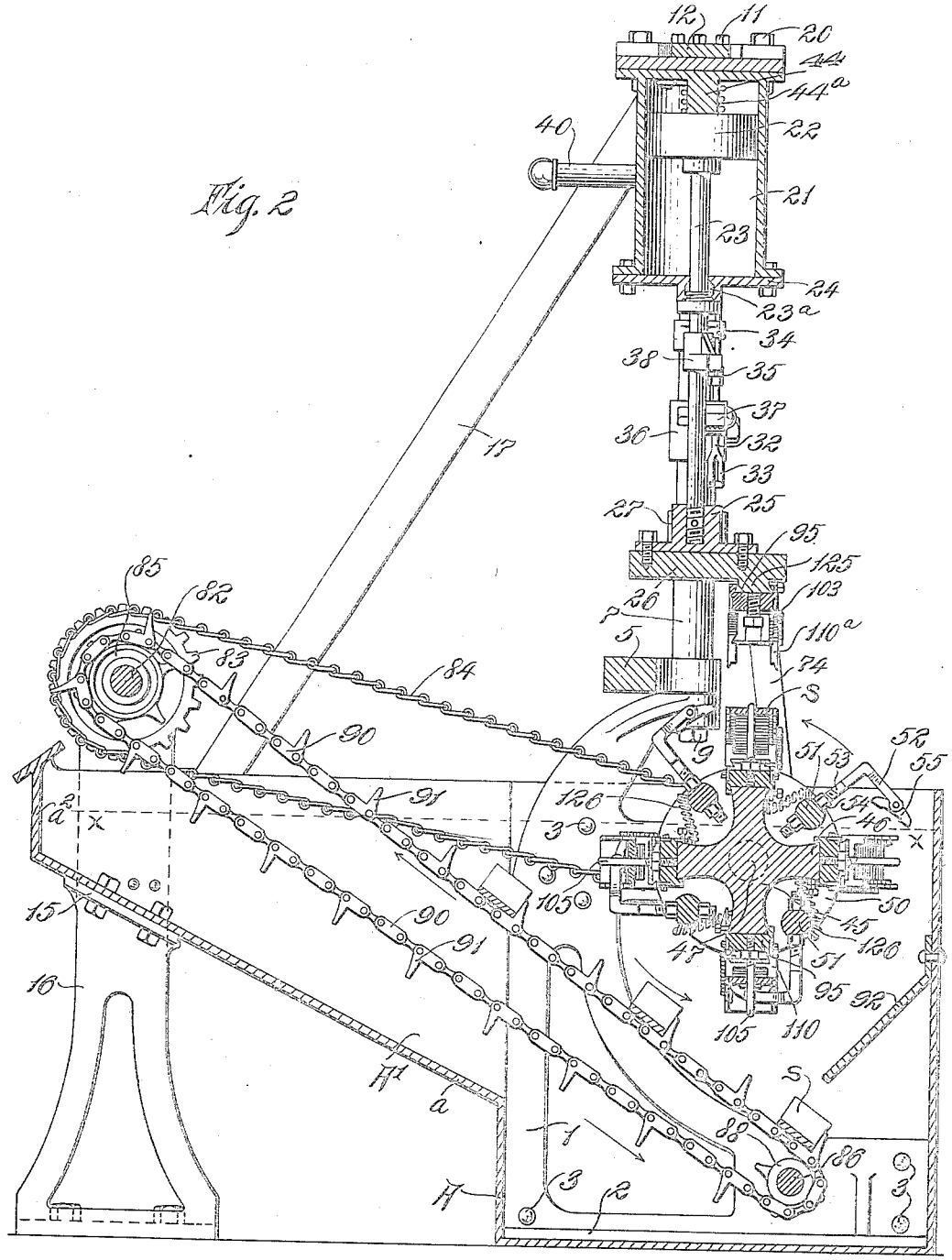

C. F. SCHULTIS.
MACHINE FOR FORMING METAL BODIES.
APPLICATION FILED DEC. 2, 1915.
1,302,228.
Patented Apr. 29, 1919.
5 SHEETS—SHEET 3.
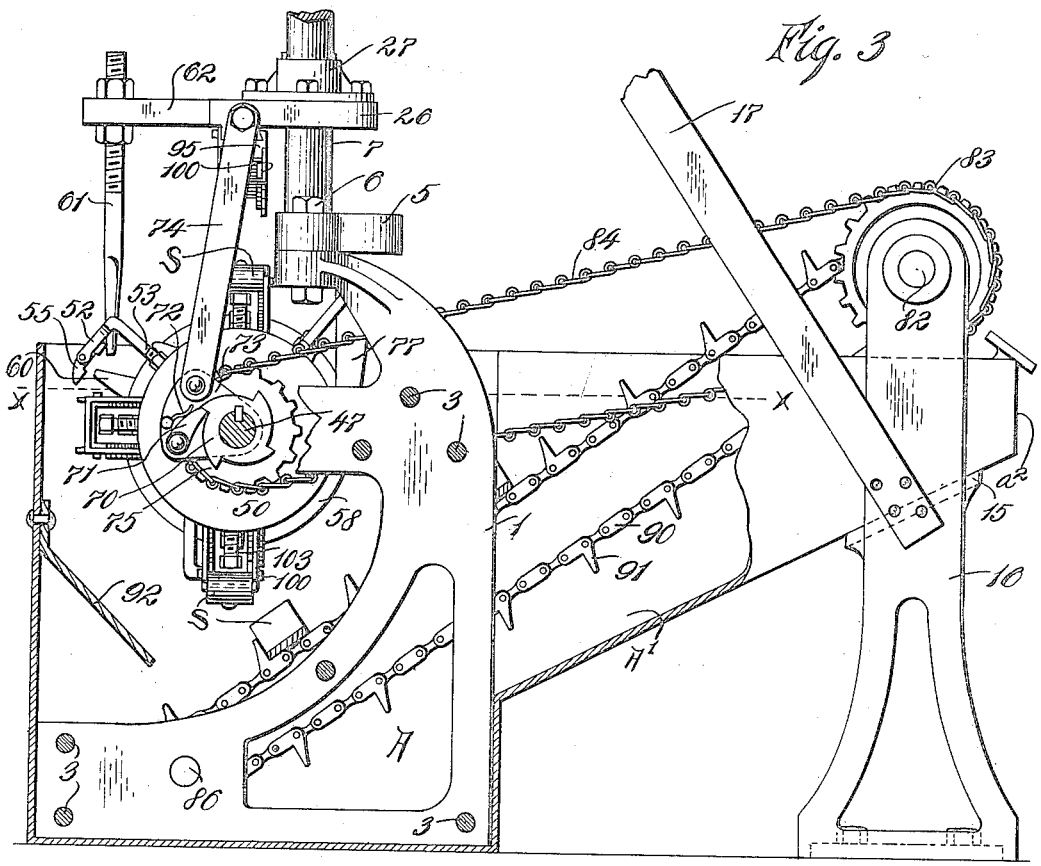
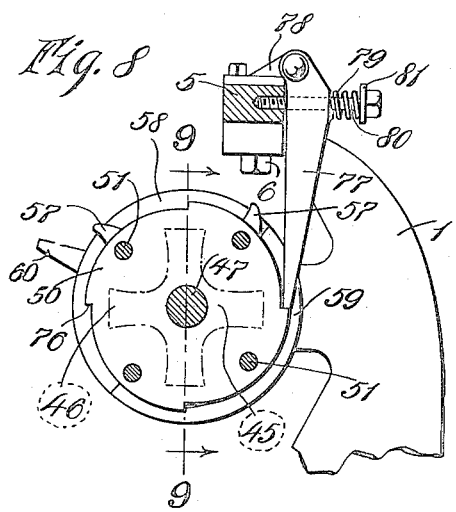
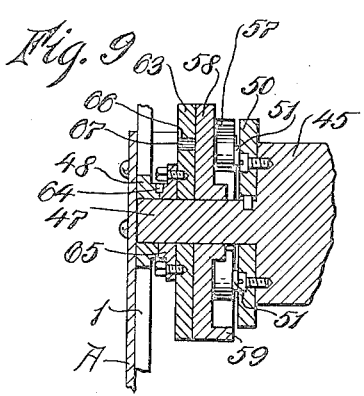
Inventor
Charles F. Schultis
By Hull, Smith, Brock & West
Attys.

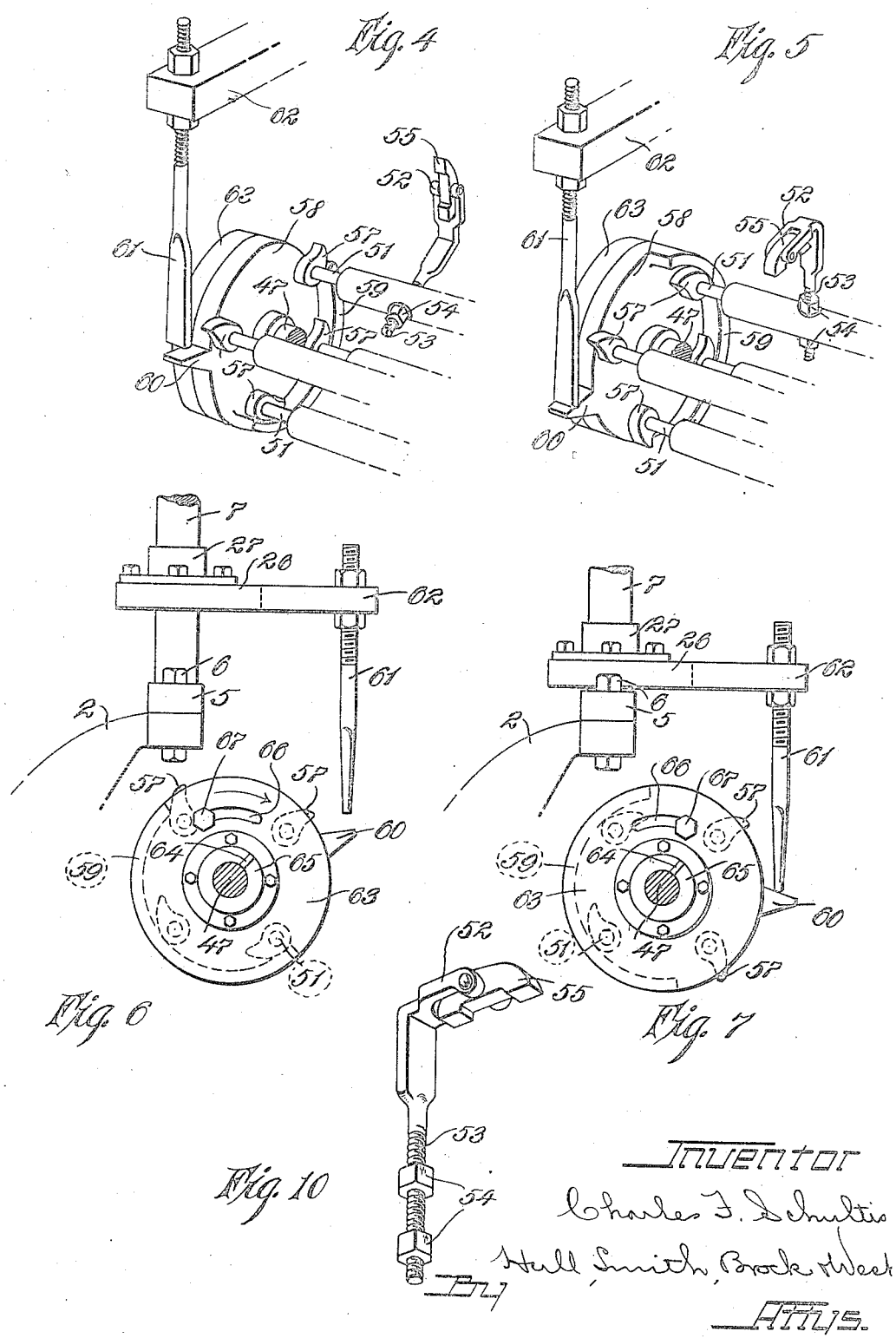

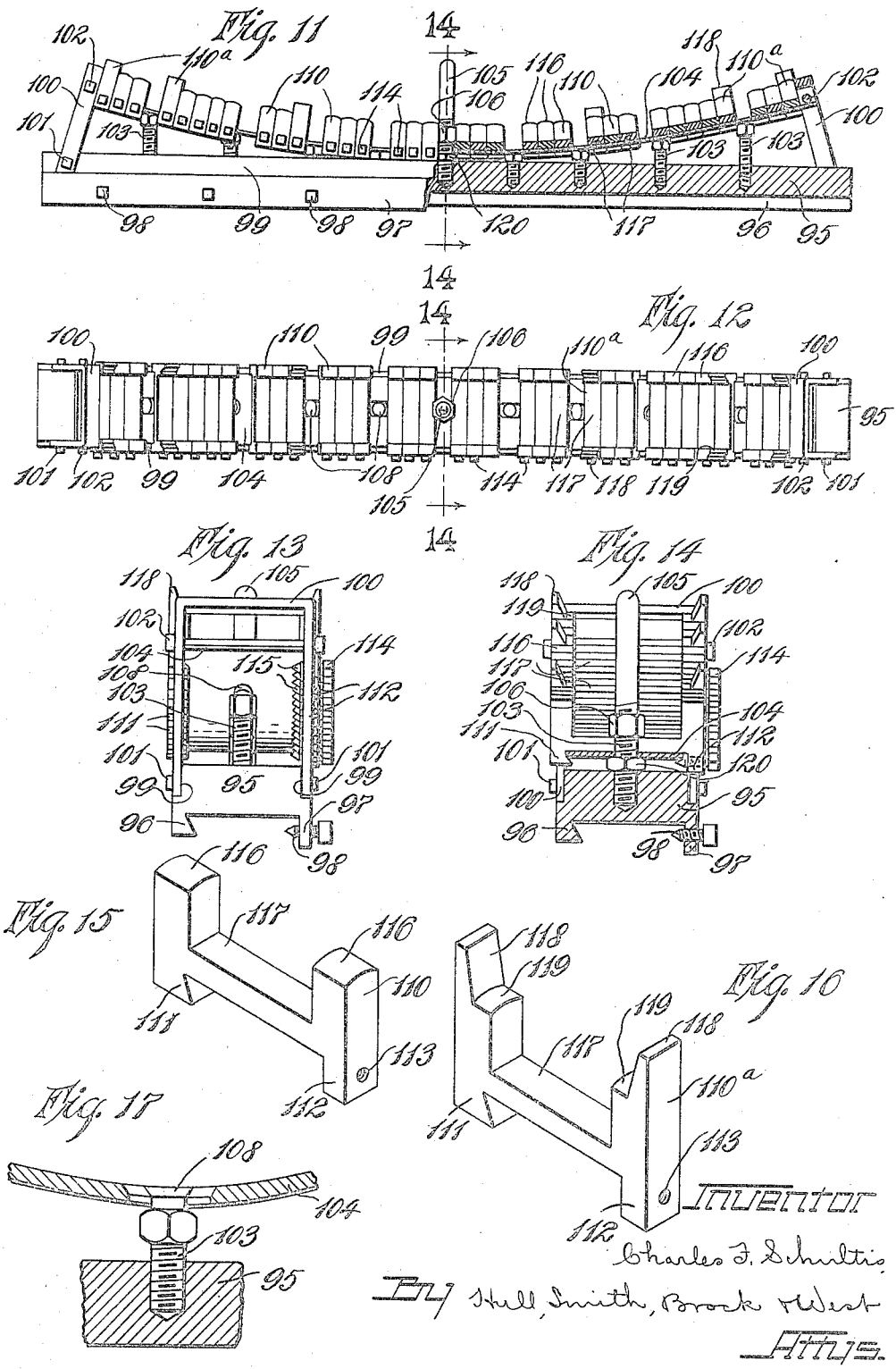

UNITED STATES PATENT OFFICE.

CHARLES F. SCHULTIS, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

MACHINE FOR FORMING METAL BODIES.

1,302,228.   Specification of Letters Patent.   Patented Apr. 29, 1919.

Application filed December 2, 1915. Serial No. 64,684.

*To all whom it may concern:*

Be it known that I, CHARLES F. SCHULTIS, a citizen of the United States, residing at Cleveland, in the county of Cuyahoga and State of Ohio, have invented a certain new and useful Improvement in Machines for Forming Metal Bodies, of which the following is a full, clear, and exact description, reference being had to the accompanying drawings.

This invention relates to machines for forming metal bodies, the invention being especially suitable for embodiment in a spring cambering machine. Because of its peculiar adaptability to this class of machines, the same will be shown and described herein in such connection. It will be understood, however, that I do not limit the invention to the details of construction shown herein, which I have selected merely as illustrative of one embodiment of my invention, nor its use to that of a spring cambering machine, except as required by the terms of the annexed claims.

The principal objects of the invention are to provide a machine of the aforesaid class which may be conveniently operated by one attendant; which is practically continuous in its operation of forming metal bodies, such a springs; and which is practically automatic in its operation, after a piece of work has been placed in the machine and the attendant has set the same in operation, the machine thereafter acting to form the metal body and deliver it from the machine, complete in so far as the forming operation is concerned.

A further object is to provide, in a machine of this nature, a rotatable table having a plurality of object-supporting faces or portions and a reciprocating head that is arranged to coöperate with the faces or portions, and wherein the reciprocation of the head rotates the table to present the various faces of the table successively into operative relation to the head.

Further objects are to provide the machine with means for clamping objects to the faces or work-supporting portions of the table, which clamping devices are actuated substantially coincident with and by the depression of the head of the machine; to provide further means for releasing the clamping devices at a given phase in the rotation of the table; and to provide an ejecting apparatus or conveyer for removing the formed objects from the machine, which ejecting apparatus or conveyer is preferably actuated by the rotation of the table.

A further object comprehended by my invention is the production of a templet that is made up of a flexible member, the contour of which may be altered at will, and a series of interchangeable bearing blocks for attachment thereto. In the case of forming longitudinal bodies, such as vehicle springs, the aforesaid bearing blocks are provided with extensions for engagement with the lateral edges of the body, thereby to straighten the same in one plane while imparting to it the desired shape in a plane at substantially right angles to the former plane.

With the foregoing objects in view, and others which will become apparent as this description proceeds, the invention may be defined as consisting of the combinations of elements set forth in the claims annexed hereto, and illustrated in the accompanying drawings, forming a part hereof.

In the drawings, Figure 1 represents a sectional front elevation of a spring cambering and tempering machine constructed in accordance with my invention; Fig. 2 is a left hand sectional side elevation of the machine; Fig. 3 is a fragmentary right hand end elevation thereof, certain parts of the machine being broken away to more clearly disclose its construction; Figs. 4 and 5 are details in perspective of the parts associated with the left hand end of the rotatable table and constituting the mechanism for operating the clamping devices, the views including the actuating member which is carried by the head of the machine; Fig. 6 is a sectional detail on the line 6—6 of Fig. 1 and looking in the direction of the arrows, the view showing the parts illustrated in the two preceding figures and in substantially the same position as they occupy in Fig. 4;

Fig. 7 is a view similar to Fig. 6, but showing the parts in the position they occupy in Fig. 5; Fig. 8 is a section on the line 8—8 of Fig. 1 and looking in the direction of the arrows; Fig. 9 is a sectional detail on the line 9—9 of Fig. 8; Fig. 10 is a detail in perspective of one of the clamping devices; Figs. 11 and 12 are a front elevation, partly in section, and a plan, respectively, of one of the adjustable templets; Fig. 13 is a left hand end elevation of the templet, as viewed in Fig. 11; Fig. 14 is a central, vertical section of the templet, taken on the line 14—14 of Figs. 11 and 12, looking toward the right; Fig. 15 is a perspective view of one type of bearing block used in the formation of the adjustable templet; Fig. 16 is a similar view of another form of bearing block having extensions for engaging the lateral edges of the work and straightening the same; and Fig. 17 is a fragmentary longitudinal section through the templet.

Taking up a detailed description of the invention by the use of reference characters, A represents a tank that is substantially rectangular in plan and having a rearward extension A'. The bottom wall $a$ of the extension is inclined upwardly from front to rear, where it joins a shallow vertical wall $a^2$.

Within each end of the tank A there is a frame 1, having a base 2, and which may be secured to the end wall of the tank in any suitable manner, as by means of rivets 3. The upper ends of the frame 1 are connected by a substantial beam 5, each end of the beam being connected to the adjacent frame by a bolt 6. Supported by the beam 5, and spaced inward from each end thereof, is a post 7, the lower end of each post being shown in dotted line in Fig. 1, as reduced at 8, and having a nut 9 applied to it, where it projects below the beam 5. Flanges 10 are carried by the upper ends of the posts, and to these flanges is secured, as by bolts 11, a top plate 12. It will be seen upon referring to Figs. 2 and 3, that the upper end of the rear extension A' of the tank is supported upon ledges 15 of standards 16. The upper portion of the frame work comprising the foregoing parts 1 to 12 is braced by stringers 17 which are fastened at their lower ends to the standards 16 and at their upper ends by means of angle clips 18 and bolts 19 to the top plate 12.

Suspended from the central portion of the top plate 12, and secured thereto by bolts 20, is a pressure fluid cylinder 21. This cylinder contains a piston 22, the rod 23 whereof extends through a packing gland $23^a$ in the cylinder head 24 and has secured to its lower end a flanged fitting 25.

What I have referred to hereinbefore as the head of the machine, is shown at 26, and this head is rigidly secured to the fitting 25. Near each of its ends, the head 26 is provided with a sleeve 27 that is reciprocable upon one of the posts 7.

I have already referred to the pressure fluid cylinder 21. As steam is found a suitable medium for operating my machine, steam is referred to as the pressure fluid throughout the following description, although it will be understood that this does not limit the invention to the use of this particular operating fluid. I have shown more or less conventionally, the cylinder 21 as provided with a steam chest 30 within which there is housed a sliding D-valve 31 that is adapted to be operated by means of a rod 32, having an operating handle 33 at its lower end. The rod is guided through a bracket 34 that is carried by the right hand post 7, and below this bracket, a stop 35 is secured to the rod. A second bracket 36 is supported by and extends in substantially the same direction as the bracket 34 from the aforesaid post 7, the latter bracket terminating adjacent the piston rod 23, and having pivoted to its end, a rocker arm 37. A finger 38, adapted for coöperation with the left hand end of the rocker arm 37, is secured to the piston rod above the rocker arm. The opposite end of the rocker arm is adapted for coöperation with the stop 35, the movement of the rocker arm by the stop 35 being limited by a stationary stop 39, that is carried by the bracket 36. Steam may be introduced into the steam chest 30 through a supply pipe 40, the steam having access to the lower portion of the cylinder through a port 41, and to the upper portion thereof through a port 42. An exhaust port 43 communicates with the steam chest within the confines of the D-valve 31.

From the above description it will be seen that, when the operator desires to depress the head of the machine, he may grasp the operating handle 33 and pull downward on the rod 32 until the D-valve 31 assumes its lowest position when the stop 35 will be in engagement with the right hand end of the rocker arm 37. By reason of the position thus given the D-valve 31, steam may be admitted from the steam chest through the port 42, to the upper end of the cylinder 21, and, acting upon the upper end of the piston 22 will force the same downward to depress the head 26, through the intervention of the piston rod 23. When the head 26 has reached the lower limit of its movement the finger 38 will engage the left hand end of the rocker arm 37 and depress the same, elevating the opposite end of the rocker arm, and consequently lifting the stop 35 and rod 32 to return the D-valve to its original or upper position. Thereupon steam is admitted to the lower end of the cylinder through the port 41, and the piston 22 is elevated to the position shown in the drawing, the steam in the upper end of the cylinder escaping through the port 42, the interior of the D-valve, and the exhaust port 43. The upward movement of the piston 22 is limited by an abutment 44 which depends from the head of the cylinder and is surrounded by a spring 44ª which, when relaxed, extends below the abutment and serves to gradually retard the speed of the piston and cushion its blow against the abutment. The parts will remain in this position until the operator again manually operates the valve 31.

It is obvious that pedal operated mechanism may be connected to the rod 32, so that the attendant may actuate the valve 31 by foot power, if it is so desired. Such a modification or addition is so obvious, however, that it is deemed unnecessary to illustrate it.

45 represents a rotatable table, shown herein as provided with four work-supporting faces or portions 46, such faces or portions being spaced at equal distances apart about the table. Gudgeons 47 extend from the ends of the table and are journaled in bosses 48 of the end frames 1. Fixed to each of its ends and forming a part of the table 45 is a disk 50 within which are journaled the reduced ends of shafts 51 that are located one within the space between adjacent faces 46 of the table.

Carried by each of the shafts 51 is a plurality of clamping devices comprising each a bifurcated head 52 and a threaded shank 53, the head and shank being disposed at substantially right angles to each other. The shaft 51 is provided with an aperture for the reception of the shank of each of the clamping devices, the shank being adjustably locked or secured within the aperture of the shaft by nuts 54, located on opposite sides of the shaft. A bearing plate 55 is pivoted between the forks of the bifurcated head 52 of each clamping device, for a purpose which will be explained hereinafter.

The reduced left hand ends of the shafts extend through and beyond the corresponding disk 50, and have secured to them cams 57 (see Figs. 4 to 7). A disk 58 is loosely journaled upon the left hand gudgeon 47 of the table adjacent the cams 57, and said disk is provided with a lateral circumferential flange 59 wherewith the cams 57 are adapted to coöperate. The disk has also a peripheral lug 60 which projects toward the front of the machine. Adapted to engage this lug and oscillate the disk 58 is a rod 61 which is adjustably carried by an extension 62 of the head 26. 63 is a stationary disk which is located in juxtaposition to the disk 58, and is fixed, in any suitable manner, to the adjacent portion of the frame 1, as by means of a key 64 (Figs. 1 and 9) that occupies opposed notches in the boss 48 of the frame, and in the hub portion 65 of the stationary disk 63. The stationary disk is provided with a concentric slot 66 through which projects a pin 67, from the movable disk 58.

Keyed, or otherwise secured to the right hand gudgeon 47 of the table 45 is a four-toothed ratchet 70 wherewith is adapted to coöperate a pawl 71, actuated by a spring 72. The pawl and spring are carried by a segmental plate 73 that is journaled upon the gudgeon of the table next to the ratchet 70. This plate is connected to the adjacent end of the head 26 of the machine, through a link 74. Therefore, upon each reciprocation of the head 26, the plate will be oscillated to carry the pawl 71 from one tooth of the ratchet 70 to the next adjacent tooth, and rotate the ratchet, and consequently the table, through 90°. A sprocket wheel 75 is secured to the gudgeon 47 between the segmental plate 73 and the adjacent disk 50. The purpose of this sprocket wheel will be explained presently.

The left hand disk 50 is provided with four peripheral teeth 76 for coöperation with the free end of a detent pawl 77 that is pivoted at its upper end to a bracket 78, carried by the beam 5. The pawl is moved toward the disk by a spring 79 that surrounds the screw 80 which passes through an opening in the pawl and is threaded into the rear side of the beam 5, the spring 79 being confined between a washer 81 that bears against the head of the screw, and the opposed surface of the pawl.

The ends of a shaft 82 are journaled within the upper ends of the standards 16, and immediately inside the right hand standard, the shaft has secured to it a sprocket wheel 83 over which a sprocket chain 84 passes, the chain embracing also the previously mentioned sprocket wheel 75 that is carried by the right hand gudgeon of the table. Between the sprocket wheel 83 and the opposite end of the shaft 82, there are distributed along the shaft, sprocket wheels 85. These sprocket wheels are fastened to the shaft in any suitable manner. A shaft 86 is located within the bottom of the tank A and has its ends journaled within bosses 87 of the frames 1. This shaft is also equipped with sprocket wheels 88, corresponding in number, pitch and spacing to the sprocket wheels 85 of the shaft 82. Chains 90 are entrained about the corresponding sprocket wheels 85 and 88 of the shafts 82 and 86, respectively, and these chains contain links having extensions 91, the chains thereby constituting conveyers for articles that are dropped from the table into the lower portion of the tank and deflect toward the chains or conveyers by the inclined plate 92 that extends inward and downward from the front wall of the tank.

It will be observed that the cross section of the table 45 adjacent each of its portions 46 is dove-tail in shape. This enables a templet which I will now describe to be conveniently clamped to each face of the table. Each templet is built upon a base 95, having its underneath surface grooved longitudinally, and undercut at the rear to form an overhanging rail 96 while the extension formed on the opposite side of the base is at substantially right angles to the top wall of the groove and constitutes a straight flange 97. This flange has a number of threaded openings for the reception of set screws 98 that are provided with tapered or pointed ends. Therefore, when the base is placed upon one of the faces of the table and the screws are set in against the adjacent edge thereof, their tapered ends engage the receding side of the dove-tailed portion of the table, in much the same manner as the undercut rail 96 engages the opposite side thereof, and securely connects the base to the table.

The front and rear sides of the base are rabbeted along their upper edges, as shown at 99. Each end is straddled by a U-shaped stirrup 100, each parallel branch of which is connected to the base by a screw 101. A bolt 102 extends across the stirrup and through its parallel branches, adjacent its upper end. A series of jack screws 103 are threaded into the upper side of the base and are spaced at convenient distances apart longitudinally thereof, and these jack screws have swiveled to their upper ends, a flexible plate 104. At substantially the center of the base, an index post 105, having a squared portion 120 above and below which the post is threaded, is screwed into the base, and constitutes in effect, a jack screw for the adjacent portion of the plate 104.

A nut 106 is applied to the threads of the post 105 above its aforesaid squared portion for a purpose which will presently be explained. The upper ends of the jack screws are formed with tapered heads 108, as clearly shown in Fig. 17. This forms a permanent but variable connection between the plate and each screw which permits, by reason of the elongation of the slot, a longitudinal movement of the plate along the head of the screw.

This construction allows the plate 104 to be bent into any shape desired by the adjustment of the jack screws. For instance, the ends of the plate may be drawn downward to a plane below the portions sustained by the next adjacent jack screws, while the center of the plate may remain in the position shown, thereby rendering the plate of a compound curvature.

Adapted to be distributed along the plate 104, are a number of bearing blocks 110, the bottom sides of which correspond in shape to the bottom of the base 95 previously described. As a consequence thereof, each block has an undercut tooth 111 at one end, and a straight tooth 112 at the other. The latter tooth has a threaded opening 113 for the reception of a set screw 114, having a tapered end, as shown at 115. The bearing surface of each block is curved transversely, as shown at 116, and between the ends thereof, the block is cut away at 117 for a reason that will be set forth in the description of the tempering operation.

In Fig. 16 there is shown a bearing block which differs from the one above described by having tapered extensions 118, that rise from the outer sides of the bearing surface 119. This form of block is designated 110$^a$. The blocks 110 and 110$^a$ may be distributed along the plate 104 in positions to suit the requirements of the particular piece of work that is to be performed, and clamped thereto by the set screws 114, the screws entering beneath the adjacent edge of the plate and forming a connection therewith, similar to that formed by the undercut tooth 111 of the opposite end of the bearing block. This connection enables any one of the blocks to be removed entirely independently of the others by simply unscrewing the screw until the point is withdrawn from beneath the plate, when the block may be tilted upward and backward and its undercut tooth released from the rear edge of the plate. As previously mentioned, the extensions 118 of the blocks 110$^a$ are for engagement with the edges of the spring plate that is to be formed, the same acting to straighten the spring longitudinally while it is being cambered. Comparatively few of the blocks 110$^a$ are required for the straightening of the plates. When the templet is constructed as illustrated in Figs. 11 to 14, the nut 106, on the index post 105, is threaded down to contact with the adjacent blocks 110 and firmly hold the central portion of the plate 104 in contact with the squared portion 120 of the post.

Templets of the shape illustrated in Figs. 11 to 14 are shown as clamped to the faces 46 of the table 45. These templets may be said to be concaved, and a complementary or convexed templet of precisely the same construction is secured to the dove-tailed portion 125 of the head 26.

It will be observed in Fig. 1, that intervals or spaces are left between groups of bearing blocks of the upper or convexed templet, for the passage of the clamping devices, to which the reference numeral 52 is applied. It will be mentioned, in this same connection, that the shafts 51, which carry the clamping devices, are rotated in a direction to retain the clamping devices in ineffective position, by springs 126, each of which springs has one of its ends connected to a pin extending from the side of the shaft 51, and its opposite end connected to a convenient part of the table 45.

In Figs. 1, 2 and 3, the springs upon which the machine is operating are designated S and comprise each a leaf having an eye formed at each end. As they are introduced into the machine they are practically straight, and are, as usual, provided with a central aperture which may be placed over the index post 105. By this means, and by the engagement of each of its side edges with the extensions 118 of the bearing blocks 110ª, the spring is properly positioned with respect to the templet.

For the purpose of tempering the springs, the tank A is filled with a suitable solution or oil to about the level of the dotted line $x$—$x$. It will be understood, of course, that ordinary cooling coils, etc., may be employed in connection with the tank.

In describing the operation of the machine, it will be assumed that a spring, heated to a proper degree for tempering, has been placed upon the upper templet of the table. The operator now draws down on the operating handle 33 to actuate the D-valve 31 and introduce steam into the upper end of the cylinder 21. Thereupon, the piston descends and depresses the head 26, to present the upper templet to the spring and shape the same to conform to the lower templet. Upon the descent of the head the rod 61 thereof engages the lug 60 of the disk 58 and rotates the disk so that the upper end of the flange 59 engages one of the cams 57 and oscillates the corresponding shaft 51 to move the clamping devices 52 over and against the spring that is confined between the templets. When overridden by the flange 59, the cam 57 is retained in the position to which it has been rocked, and against the action of the spring 126, until the cam escapes from within the opposite end of the flange. Therefore, as the head 26 returns to its upper position and withdraws its templet from the spring, the spring will be retained in contact with the templet of the table. Upon the rise of the head 26, the sector plate 73 is oscillated by the link 74 which connects said plate to the head. Through the pawl 71, the ratchet 70, that is keyed to the gudgeon of the table, is rotated through 90°, thereby rotating the table a corresponding distance, or until the next templet thereof is presented in proper operative relation to the templet of the head.

The disk 58, by reason of the frictional engagement of its flange with the cams 57, is restored to its former position when the table is thus rotated.

It will be recalled that the only exertion on the part of the attendant necessary to perform the operation above described is the pulling down of the operating handle 33, the finger 38 that is carried by the piston rod, the rocker arm 37, and the stop 35 that is attached to the valve rod 32, acting to move the valve to its original position, which results in the reversal of the motor and the completion of the operation above described.

Another spring may now be placed in the machine, and the foregoing operation repeated. The spring previously cambered, being submerged within the liquid contained in the tank A, is cooled and tempered thereby. The spring continues to ride upon the templet of the table until the cam on the end of the shaft which carries its clamping devices, escapes from beneath the flange 59 of the disk 58, and allows the spring 126 to rock the shaft 51 and remove the clamping devices from the spring. With the parts as illustrated, this releasing occurs between the lower and front positions of the templet. When the spring is released, it is deflected rearwardly by the plate 92 and lodges upon the conveyer chains 90. As previously explained, these conveyer chains are carried by sprockets 85 that are fastened to the shaft 82, which shaft is driven through the sprocket wheel 83, chain 84, and the sprocket wheel 75, from the rotatable table 45. The springs are ejected from the rear end of the machine complete in so far as the cambering and tempering operations are concerned.

I have already explained that the central portions of the bearing blocks 110 and 110ª are cut away at 117. This is to allow access of the tempering solution to a greater area of the surface of the spring than would otherwise be possible.

Having thus described my invention, what I claim is:—

1. In a machine of the character set forth, the combination of a rotatable table having a plurality of angularly disposed templets, a head movable toward and from the table and having a templet complementary to the templets of the table, mechanism for moving the head, connections between the head and table whereby the movement of the head will rotate the table to successively present its respective templets in operative relation to the templet of the head, clamping devices carried by the table and adapted for holding articles on the templets thereof, after the head recedes, a member carried by the head, and mechanism engaged and actuated by said member for operating the clamping devices.

2. In a machine of the character set forth, the combination of a rotatable table having a plurality of angularly disposed templets, a head movable toward and from the table and having a templet complementary to the templets of the table, mechanism for moving the head and table to successively present the respective templets of the table in operative relation to the templet of the head, a shaft rotatably supported by the table adjacent each of its templets, a clamping device carried by each shaft and adapted for holding an article on the adjacent templet, the shaft having an offset, a member rotatable upon substantially the same axis as the table, said member having a segmental guide that is substantially concentric to the rotating axis of said member for engagement by the offset of each of the aforesaid shafts, and means for rotating said member upon the depression of the head to cause its aforesaid guide portion to engage the offset of one of the shafts and rock the same in a direction to move the clamping device that is carried by said shaft to effective position.

3. In a machine of the character set forth, the combination of a rotatable table having a plurality of angularly disposed templets, a head movable toward and from the table and having a templet complementary to the templets of the table, mechanism for moving the head, connections between the head and table whereby the movement of the head will rotate the table to successively present its respective templets in operative relation to the templet of the head, a shaft rotatably supported by the table adjacent each of its templets, a clamping device carried by each shaft and adapted for holding an article on the adjacent templet, the shaft having an offset, a member rotatable upon substantially the same axis as the table, said member having a segmental guide that is substantially concentric to the rotating axis of said member for engagement by the offset of each of the aforesaid shafts, the head and said member having coöperating portions whereby said member is rotated upon the depression of the head to cause its aforesaid guide portion to engage the offset of one of the shafts and rock the same in a direction to move the clamping device that is carried by said shaft to effective position, and means for returning the shaft to normal position when the offset portion thereof escapes from the guide portion of the aforesaid member.

4. In a machine of the character set forth, the combination of a rotatable table having a plurality of angularly disposed templets, hafts rotatably supported by said table, one between adjacent templets, a clamping device carried by each shaft and adapted for holding articles on one of the adjacent templets, means tending to retain the shafts in normal position, a cam carried by each shaft, a member rotatable substantially upon the rotating axis of the table and having a segmental guide that is substantially concentric to the rotating axis of said member, a head movable toward and from the table and having a templet complementary to the templets of the table, and mechanism for moving the head and table to successively present the respective templets of the table in operative relation to the templet of the head, the head and aforesaid rotatable member having portions which coöperate to rotate said member upon the descent of the head thereby to move the guide portion of said member into engagement with and cause such portion to override the cams of the respective shafts successively as the table is turned, for the purpose of rocking the shafts in a direction to move the aforesaid clamping devices to effective position.

5. In a machine of the character set forth, the combination of a movable element having a plurality of templets, a head movable toward and from the element, and having a templet complementary to the templets of said element, mechanism for moving the head and element to successively present the respective templets of the element in operative relation to the templet of the head, and means actuated by the head for clamping articles to the templets of the element.

6. In a machine of the character set forth, the combination of a table, a templet carried thereby, a head movable toward and from said table and having a templet complementary to the templet of the table, the table being movable to shift its templet from operative relation to the templet of the head, mechanism for moving the head, and means actuated by the movement of the head for clamping articles to the first mentioned templet and to retain them during the movement of the table.

7. An adjustable spring forming templet comprising a base, a flexible supporting member, a plurality of jack screws threaded into the base and having heads that are swiveled in the flexible member, and a series of bearing blocks carried by the supporting member, certain of said bearing blocks having extensions which project beyond their bearing surfaces and the opposed faces of which diverge away from the bearing surfaces, said extensions being arranged to engage the lateral edges of the springs, thereby to correct any transverse deformity of the spring.

8. A templet comprising a plate having parallel side edges in planes at substantially right angles to its top surface, a series of bearing blocks for application thereto, each block having opposed teeth, one adjacent each end of the block, one of said teeth being undercut on an oblique angle to embrace one edge of the plate, and a screw threaded through the other tooth and having a tapered end for engagement beneath the opposite edge of the plate.

9. A templet comprising a plate and a series of bearing blocks carried by said plate, certain of said blocks having extensions which project beyond their bearing surfaces and the opposed faces of which diverge away from the bearing surfaces, said extensions being arranged to engage the edges of the object to be formed and thereby act upon the same in a plane at right angles to that in which the bearing surfaces act upon the object.

In testimony whereof, I hereunto affix my signature in the presence of two witnesses.

CHARLES F. SCHULTIS.

Witnesses:
ROBERT L. BRUCK,
HUGH B. McGILL.